US008515073B2

(12) United States Patent
Arunan

(10) Patent No.: US 8,515,073 B2
(45) Date of Patent: Aug. 20, 2013

(54) METHOD AND SYSTEM FOR SECURE COMMUNICATION IN NEAR FIELD COMMUNICATION NETWORK

(75) Inventor: Thenmozhi Arunan, Bangalore (IN)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 832 days.

(21) Appl. No.: 12/325,375

(22) Filed: Dec. 1, 2008

(65) Prior Publication Data

US 2009/0144550 A1 Jun. 4, 2009

(30) Foreign Application Priority Data

Nov. 30, 2007 (IN) .......................... 2840/CHE/2007

(51) Int. Cl.
*H04L 9/00* (2006.01)
*H04L 9/08* (2006.01)
*H04W 4/00* (2009.01)

(52) U.S. Cl.
CPC ............. *H04L 9/0891* (2013.01); *H04W 4/008* (2013.01)
USPC ........... 380/273; 380/270; 380/277; 455/41.1

(58) Field of Classification Search
USPC ......................................................... 380/273
See application file for complete search history.

(56) References Cited

U.S. PATENT DOCUMENTS

| | | | | |
|---|---|---|---|---|
| 5,253,294 A * | 10/1993 | Maurer | ........................ | 380/264 |
| 5,850,444 A * | 12/1998 | Rune | ............................... | 705/79 |
| 6,245,361 B1 * | 6/2001 | Merritt | ......................... | 424/665 |
| 7,152,693 B2 * | 12/2006 | Man et al. | ...................... | 173/183 |
| 7,640,584 B1 * | 12/2009 | Roggendorf | .................... | 726/22 |
| 2001/0034712 A1 * | 10/2001 | Colvin | ............................ | 705/52 |
| 2002/0138748 A1 * | 9/2002 | Hung | ............................. | 713/190 |
| 2003/0048905 A1 * | 3/2003 | Gehring et al. | ............... | 380/270 |
| 2004/0005057 A1 * | 1/2004 | Jang et al. | ..................... | 380/270 |
| 2006/0115089 A1 * | 6/2006 | Carter et al. | .................. | 380/273 |

(Continued)

FOREIGN PATENT DOCUMENTS

| | | |
|---|---|---|
| CN | 1236517 A | 11/1999 |
| JP | 60-223247 A | 11/1985 |

(Continued)

OTHER PUBLICATIONS

Bank of Japan; Institute for Monetary & Economic Studies (IMES), IMES Discussion Paper Series, Paper No. 2005-J-22, "As to the Problem in 200 of Encryption Algorism;" Dec. 16, 2005; Japan Bank & Finance.

(Continued)

*Primary Examiner* — Matthew Henning
(74) *Attorney, Agent, or Firm* — Cha & Reiter, LLC

(57) ABSTRACT

Disclosed is a method for secure communication between a plurality of electronic devices in a Near Field Communication (NFC) network, and a system for supporting the method. To this end, a first electronic device shares a plurality of keys with the at least one device among the plurality of electronic devices and selects a first key among the plurality of keys and exchanges data encrypted based on the first key with the at least one device among the plurality of electronic devices and replaces the first key with at least one key among the plurality of keys while exchanging the data after at least one predetermined criterion has been satisfied.

26 Claims, 5 Drawing Sheets

(56) References Cited

U.S. PATENT DOCUMENTS

| | | | |
|---|---|---|---|
| 2006/0198364 A1* | 9/2006 | Fujii | 370/352 |
| 2007/0038854 A1 | 2/2007 | Cheon et al. | |
| 2007/0067464 A1* | 3/2007 | Bardachenko et al. | 709/227 |
| 2007/0079113 A1* | 4/2007 | Kulkarni et al. | 713/150 |
| 2007/0109124 A1* | 5/2007 | Park et al. | 340/572.1 |
| 2007/0116292 A1 | 5/2007 | Kurita et al. | |
| 2007/0123305 A1 | 5/2007 | Chen et al. | |
| 2007/0171848 A1 | 7/2007 | Fujii et al. | |
| 2007/0208930 A1 | 9/2007 | Blank et al. | |
| 2007/0276765 A1* | 11/2007 | Hazel et al. | 705/71 |
| 2009/0128392 A1* | 5/2009 | Hardacker et al. | 341/175 |
| 2010/0150347 A1* | 6/2010 | Teruyama | 380/255 |

FOREIGN PATENT DOCUMENTS

| | | |
|---|---|---|
| JP | 63-151136 A | 6/1988 |
| JP | 07-327029 A | 12/1995 |
| JP | 10-242956 A | 9/1998 |
| JP | 11-234260 A | 8/1999 |
| JP | 2002-247542 A | 8/2002 |
| JP | 2003-195750 A | 7/2003 |
| JP | 2004-260367 A | 9/2004 |
| JP | 2006-033266 A | 2/2006 |
| JP | 2006-186470 A | 7/2006 |
| JP | 2008-504788 A | 2/2008 |
| JP | 2008-103988 A | 5/2008 |
| JP | 2009-500735 A | 1/2009 |
| WO | WO2006-027725 | 3/2006 |
| WO | 2007-003429 A1 | 1/2007 |

OTHER PUBLICATIONS

"International Standardization Trend of NFC Standard:" Jul. 23, 2007; http://www.itscj.ipsj.or.jp/forum/forum20070723/07023_forum.pdf.

* cited by examiner

METHOD AND SYSTEM FOR SECURE COMMUNICATION IN NEAR FIELD COMMUNICATION NETWORK

CLAIM OF PRIORITY

This application claims the benefit of the earlier filing date, pursuant to 35 USC 119, to that patent an application entitled "Method and System for Secure Communication in Near Field Communication Network" filed in the Indian Patent Office on Nov. 30, 2007 and assigned Serial No. 2840/CHE/2007, the contents of which are hereby incorporated by reference.

BACKGROUND OF THE INVENTION

1. Field of the Invention

The present invention relates to the field of short-range wireless communication network and more particularly to secure communication in a short-range or near field communication network.

2. Description of the Related Art

Conventionally, wireless communication devices, such as mobile phones, personal digital assistance (PDA), smart tags, audio/video equipment, and set-top boxes are frequently used for communication. These typical communication devices can communicate with each other through short range wireless communication. For example, a mobile phone can communicate with a set-top box using one or more short range wireless communication systems such as, short range radio (e.g., Bluetooth®), infrared light (IR) and Near Field Communication (NFC).

Near Field Communication (NFC) refers to a contactless-type short range wireless communication technology. NFC employs a frequency band of 13.56 Megahertz and transmits data at a maximum rate of 424 Kbps. The communication devices in NFC operate in close proximity, for example in the order of 10 centimeters, and consume very low power. As a result, NFC is becoming more prevalent for exchanging and sharing information and many devices are incorporating such NFC systems to become NFC compatible communication devices.

NFC compatible communication devices adheres to ISO 18092 standards. In Near Field Communication (NFC), the communication devices can communicate with each other in active mode and/or passive mode. In active mode, an NFC device, for example a first device, has its own power source and can generate a Radio Frequency (RF) field for a data frame transfer. In passive mode, the first NFC device does not have its own power source. Hence, communication is always initiated by another NFC device known as initiator device.

In NFC, the target device cannot initiate a command on its own, irrespective of whether the communication is in an active mode or passive mode. In passive mode, the initiating device (initiator) initially sends a request message for establishing communication with the first device (generally referred as a target device). This creates a RF field between the initiating device and the target device. The RF field then triggers a receiver circuit in target device. The target device then returns a response in load modulation scheme.

Generally, communication using NFC technology is inherently secure due to communication occurring between communication devices over a very short distance (e.g., in the order of 10 centimeters). However, as the communication is through a wireless medium, a security framework should be provided to insure confidentiality, data integrity and authenticity. Various standards are being developed for providing security framework for NFC communications. The security framework is supported in an NFC-SEC layer. The NFC-SEC layer provides security services to applications layer and Media Access Control (MAC) layer and, thus, provides privacy and security feature in communication devices.

Two basic services provided by the NFC-SEC layer are Secure Channel Service and Shared Secret Service. In the Secure Channel Service, a link key is used to establish a secure channel. Thereafter a link encryption key and link integrity key are derived from the link key. Hence, all data frames received from different applications use the same link key during communication.

In the Shared Secret Service, a shared secret is agreed between a plurality of devices. A key is generated and/or selected based on the shared secret. This shared secret and the key are then associated with an application residing on the plurality of communication devices. Hence, data frame transfer associated with the application is done based on the shared key. In shared secret service, each application can use a different key for transfer of data frames.

The NFC device in every data frame transmission maintains and increments a sequence number (SN) counter. The NFC-SEC layer then inserts a value of the SN in a SN field of request commands and response commands that are exchanged between communicating devices. The SN is a three (3) byte (24 bits) field in the request and response commands. An application service and/or secure channel service, used by NFC link, uses a same key in the request and response commands for a maximum limit of frames, (e.g., $2^{24}$ frames). The NFC device before inserting a new value in the SN field compares the counter with the maximum limit. Thereafter, the counter is cycled and reset when the SN reaches the maximum limit. The data link communication is then closed and a new set of keys are negotiated for further communication.

However, as the same key is used for a large number of data frame exchanges, there is a possibility of a successful brute force attack, wherein the communication is compromised during transmission. Also, the NFC-SEC layer causes the communication to be paused and stops the data frame exchange when the SN counter resets. Hence, this leads to an abrupt discontinuity in NFC communication. The upper layer connections may also experience a discontinuity in the link before the NFC-SEC re-instantiates a new set of keys and starts with a new initial value for SN.

Hence there exists a need to establish secure and uninterrupted communication between communication devices in NFC.

SUMMARY OF THE INVENTION

In accordance with an aspect of the present invention, there is provided a method for secure communication between a plurality of electronic devices in a Near Field Communication (NFC) network, the method including the steps of sharing, by a first electronic device, a plurality of keys with the at least one among the plurality of electronic devices, selecting a first key among the plurality of keys, exchanging data based on the first key with the at least one among the plurality of electronic devices, and replacing the first key with at least one key among the plurality of keys while exchanging the data.

In accordance with another aspect of the present invention, there is provided a system for secure communication between a plurality of electronic devices in a Near Field Communication (NFC) network, the system includes a first electronic device including a transceiver and a processor; the transceiver for transmitting a plurality of keys with at least one device among a plurality of electronic devices and exchanging data based on a first key with the at least one device among the plurality of electronic devices and the processor for selecting the first key among the plurality of keys and replacing the first key dynamically with at least one key among the plurality of keys while exchanging the data.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF THE INVENTION

The following description with reference to the accompanying drawings is provided to assist in a comprehensive understanding of exemplary embodiments of the present invention as defined by the claims and their equivalents. It includes various specific details to assist in the understanding of the invention but these specific details are to be regarded as merely exemplary. Those of ordinary skill in the art will recognize that various changes and modifications of the embodiments described herein can be made without departing from the scope and spirit of the invention. Also, descriptions of well-known functions and constructions will be omitted for clarity and conciseness.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to, or obtained without undue experimentation by, those skilled in the art, may occur in amounts that do not preclude the effect the characteristic was intended to provide.

Figure 1:
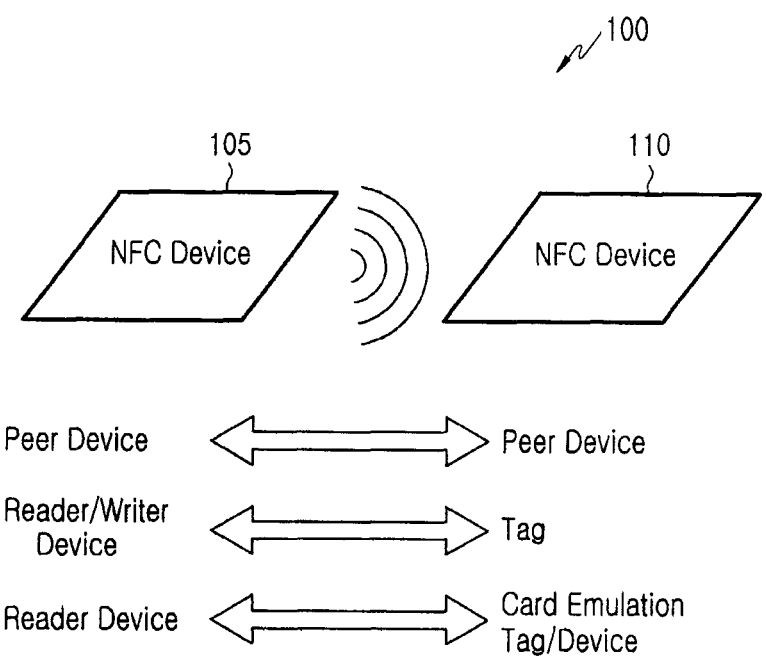
FIG. 1 illustrates an exemplary environment, where various embodiments of the present invention can be practiced.

FIG. 1 illustrates an exemplary environment 100, where various embodiments of the present invention can be practiced. The environment 100 includes a plurality of electronic device, for example, an electronic device 105 and an electronic device 110. However, only two electronic devices are shown in the environment 100, it will be apparent to the person of ordinary skill in the art that the environment 100 may include more number of electronic devices. The examples of the electronic devices 105 and 110 include, but are not limited to, Mobile phones, Smart tags, Personal Digital Assistance (PDA), and Computers. The plurality of electronic devices is capable of communicating with each other through a communication network.

In an embodiment, the electronic devices 105 and 110 are capable of communicating with each other through short range wireless communication technology. Examples of short range wireless communication technology includes but are not limited to, short range radio (e.g., Bluetooth®), infrared light (IR) and Near Field Communication (NFC). In an embodiment, the electronic devices 105 and 110 are capable of communicating with each other through Near Field Communication (NFC) technology. Hence, the electronic devices 105 and 110 are NFC compatible electronic devices. For the sake of clarity and for the purpose of this description, the electronic devices 105 and 110 will be referred as NFC device 105 and the NFC device 110.

A pair of NFC devices, for example the NFC device 105 and the NFC device 110 can operate in one of the operating modes, for example, reader/writer mode, peer-to-peer mode, and card emulation mode. The different operating modes are based on MAC protocols ISO/IEC 18092 NFCIP-1 and ISO/IEC 14443 contactless smart card standards, which are well-known and need not be discussed in detail herein.

In reader/writer mode, an NFC device is capable of reading NFC forum mandated tag types. A tag in this mode may be either active or passive. However, the tag becomes activated for communication when a reader NFC device is at a close proximity to the tag and issues initialization and read signals. In Card Emulation mode, an NFC device acts as an NFC tag to work as a traditional contactless smart card and another NFC device acts as a reader/writer device. In the Peer to Peer mode of operation, a legacy NFC device works in a half-duplex mode of operation using protocols that enable Peer to Peer mode of operation. In this mode of operation, an NFC device initiating a communication is called as Initiator and a device with which the communication is established is known as Target.

In NFC, when the communication link is established, the NFC-SEC protocols can be used to provide a secure channel framework for data exchange. In NFC-SEC, a plurality of keys is agreed between a plurality of devices, (i.e., the illustrated NFC device 105 and the NFC device 110). The NFC-SEC then maintains a table for the plurality of keys along with a reference for each key called the Key-Index. Thereafter, a first key is selected from the plurality of keys using a NFC-SEC commands and the first key is maintained at the NFC-SEC layer as the first key that will be used to secure the data exchanges on the link.

The data is then exchanged between the NFC devices 105 and 110 based on the first key for providing security. In an embodiment, the key facilitates encryption of data. In another embodiment, the key facilitates authentication of data. In an embodiment, for providing security and to protect integrity of the data frames, a Message Authentication Code (MAC) is added to each data frame exchanged between NFC devices. In an embodiment, a security standard like Advanced Encryption Standard (AES) is used to calculate the MAC. A sequence number (SN) is also added to each frame to provide message sequence integrity and prevent data replay attacks. In an embodiment, the sequence number is used for identifying data manipulation attacks.

Thereafter, the first key is dynamically changed based on a first predefined criterion. In an embodiment, the first key is replaced dynamically with a second key. The second key is selected from the set of plurality of keys previously agreed between the NFC device 105 and the NFC device 110. In an embodiment, the first predefined criterion is based on number of data frames exchanged between the NFC devices. In another embodiment, the first predefined criterion is based on amount of time elapsed since the communication with the current key is in progress. In another embodiment, the first predefined criterion is based on identification of security threat attacks.

Figure 2:
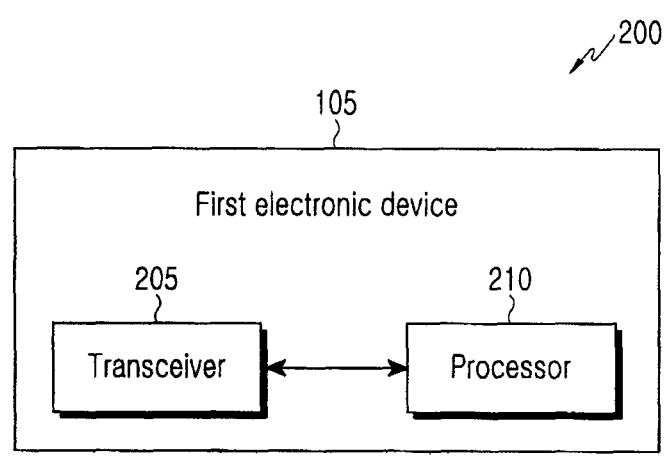
FIG. 2 illustrates a first electronic device, in accordance with one embodiment of the present invention.

FIG. 2 illustrates a first electronic device, in accordance with one embodiment of the present invention. To explain the first electronic device, references will be made to FIG. 1. However, it will be apparent to a person of ordinary skill in the art that the present embodiment can be explained with the help of any other suitable embodiment of the present invention. For the purpose of this description the first electronic device is referred as the NFC device 105.

The NFC device 105 includes a transceiver 205 and a processor 210. The transceiver 205 is capable of sharing a plurality of keys between a plurality of electronic devices, for example the NFC device 105 and the NFC device 110. The processor 210 then selects a first key from the plurality of keys shared and assembles the data that is to be exchanged based on the selected first key. In an embodiment, the processor 210 encrypts the data using the first key and the transceiver 205 transmits the encrypted data. In an embodiment, the processor receives encrypted data from transceiver 205 and decrypts the data using the first key.

The transceiver 205 exchanges data encrypted using the first key between the NFC devices 105 and 110. In an embodiment, the transceiver 205 is capable of exchanging data based on function and commands supported by NFC standards. In another embodiment, the transceiver is capable of exchanging data based on the security keys that are agreed using a plurality of parameter exchange (PAX) protocol data units (PDU) commands. The processor 210 is also capable of dynamically initiating an agreement for the key that will be used by the application and/or link layer. In an embodiment, the processor 210 changes the first key based on a predefined criterion.

In another embodiment, the processor 210 exchanges the first key dynamically with a second key while the communication is in progress. Hence, the processor 210 changes the first key dynamically with a second key without pausing and/or stopping the communication between the NFC device 105 and the NFC device 110. In an embodiment, the processor 210 selects the second key from the plurality of keys shared between the NFC devices 105 and 110.

In another aspect, the processor 210 is also capable of adding a sequence number (SN) to each frame to provide message sequence integrity and to prevent data replay attacks. The processor 210 also maintains a count for the SN number.

Figure 3:
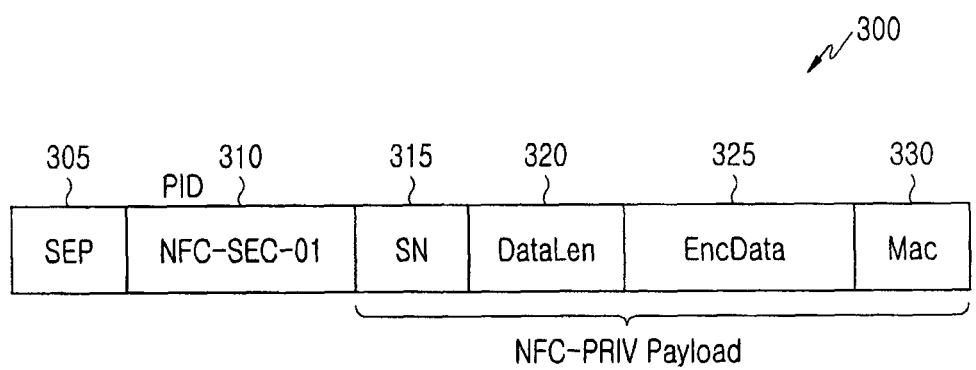
FIG. 3 illustrates a frame format in which the data is exchanged, in accordance with one embodiment of the present invention.

FIG. 3 illustrates a frame format in which the data is exchanged, in accordance with one embodiment of the present invention. In an embodiment, the frame format used by the NFC-SEC protocol is NFC-SEC Protocol data unit (PDU). The frame NFC-SEC PDU is used to convey the NFCIP-1 Data Exchange Protocol (DEP) in a secure manner. In an embodiment, the data format corresponds to the NFCIP-1 security services and protocol developed by ECMA Standards Body. The frame format has a plurality of fields that carries different information. For example, the frame format is shown to include an SEP field, NFC-SEC-01 field, SN field, DataLen field, EncData field and Mac field. Though the FIG. 3 includes six fields, however it nowhere limits the scope of the invention and hence the frame format can have more or less number of fields.

A field 305 is Secure Exchange Protocol (SEP) field. The SEP field is used to identify the exchange protocol used while communication. A field 310 is a NFC-SEC-01 field. The NFC-SEC-01 field includes a one byte "PID" field that identifies a cryptography standard used to provide security. The field 315 is Sequence Number (SN) field. The SN field indicates a sequence number of the NFC-SEC PDU. The field 320 is a data length (DataLen) field. The Datalen field is used to indicate number of bytes of encoded data that will be sent in the data frame. The field 325 includes an encrypted (EncData) data field. The EncData field provides details about the encrypted data. The field 330 is for a message authentication code (MAC). The MAC field is used to verify the authenticity and integrity of the message.

Figure 4:
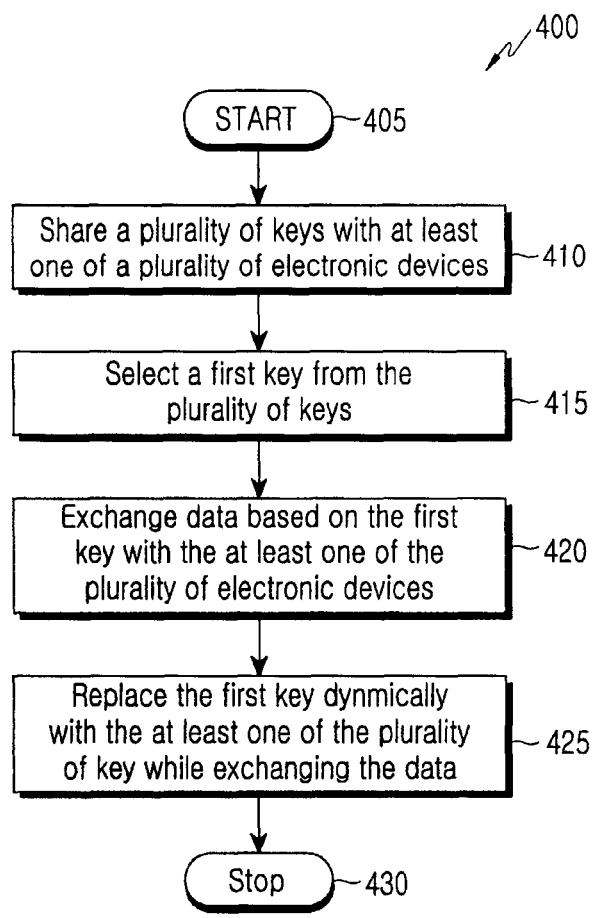
FIG. 4 illustrates a flow chart depicting a method for establishing secure communication in Near Field Communication (NFC) network, in accordance with one embodiment of the present invention.

FIG. 4 illustrates a flow chart depicting a method for establishing secure communication in Near Field Communication (NFC) network, in accordance with one embodiment of the present invention. To explain the method 400, references will be made to FIG. 1 and FIG. 2. However, it will be apparent to a person of ordinary skill in the art that the present embodiment can be explained with the help of any other suitable embodiment of the present invention. The method 400 can also include more or fewer number of steps as depicted in FIG. 4. Further, the order of the steps may also vary.

At step 405, the method 400 is initiated. A first electronic device, for example the NFC device 105 (FIG. 1), sends an indication to another electronic device, for example, the NFC device 110 for establishing a communication link. In an embodiment, the indication is automatically sent to another electronic device when the first electronic devices are brought within a predefined distance to another electronic device. For example, when the NFC device 105 is in a close proximity, for example within 10 centimeters distance, from the NFC device 110, an indication is sent to the NFC device 110.

When initial communication link is established, the NFC device becomes active for exchanging data. At step 410, a plurality of keys is initially exchanged between the NFC device 105 and the NFC device 110. At step 415, a first key is selected from the plurality of keys for exchanging data. The plurality of keys is arranged in a plurality of devices corresponding to at least one Key-Index. For example, the first key will be at a predefined key-index, for example at index one '1' in each of the plurality of NFC devices communicating with each other. Thereafter, at step 420, the data is exchanged between the NFC device 105 and the NFC device 110 based on the first key.

In an embodiment, the transceiver 205 exchanges data encrytped using the first key. Thereafter, the NFC device 105 decides to change a first key with a second key based on a predefined criterion. In an embodiment, a key-index is shared between the plurality of NFC devices. At step 425, the first key is replaced dynamically with the at least one of the plurality of keys, for example the second key, while exchanging the data. The NFC devices can exchange the data based on a key corresponding to the shared key-index. In an embodiment, the NFC-SEC layer in the NFC device ensures that all the frames are transmitted in a transmit queue before changing the key. Thereafter, the method 400 is terminated at step 430.

In an embodiment, a plurality of NFC commands and functions are exchanged at different layer in the NFC device for changing a key dynamically. Further, a plurality of NFC commands and functions are also exchanged between the plurality of NFC devices while communicating with each other. Hence, for the purpose of explanation, the method is also explained in conjunction with two exemplary methods stated in the following paragraphs. The following exemplary methods are explained with respect to a plurality of functions and commands. The functions and commands used in the following exemplary methods are solely for the sake of clarity and, thus, does not limit the scope of the invention to the exemplary methods described. Hence, a person skilled in the art can use any other functions or commands for implementation of the method.

In the first exemplary method, a NFC-SEC layer in an NFC device, for example the NFC device 105 initially makes a local decision to change a key. For example, the NFC device 105 decides to change the first key to a second key. In an embodiment, the second key corresponds to a key-index shared during the communication. Hence, the NFC-SEC layer in the NFC device 105 sends a CHANGE_KEY_REQ [Key-Index] command to LLCP layer in the NFC device 105. The CHANGE_KEY_REQ [Key-Index] command is a CHANGE_KEY_REQ command with the Key-Index. In an embodiment, the Key-Index is a unique identifier for the second key that is stored in a table in the NFC devices. In an embodiment, the communication in the LLCP layer is a Peer-To-Peer communication mode for NFC devices defined by the NFC Forum. The NFC-SEC layer ensures that all data frames in a current transmit queue are transmitted before initiating the CHANGE_KEY_REQ. In an embodiment, the LLCP in the NFC device 105 moves the state of LLCP link from an ACTIVE to a CONFIGURE state on reception of this command. Hence, this stops further data frames transmissions from the LLCP connections to be sent to NFC-SEC.

The change key request can be initiated between the NFC devices through a CHANGE_KEY_REQ command and a response is received through CHANGE_KEY_RSP command. Thereafter, the LLCP layer of the NFC device 105 sends a Parameter Exchange, PAX request command with the key-index, corresponding to the second key, to another NFC device, (e.g., the NFC device 110). The NFC device then waits for a PAX response from the NFC device 110. In an embodiment, the PAX request command is secured using the first key.

In an embodiment, all the data frames are exchanged based on the first key until the NFC device 105 receives a success command from the NFC device 110. The NFC device 110 after receiving the PAX [Key-Index], from the NFC device 105, an LLCP layer in the NFC device 110 sends a CHANGE_KEY_REQ [Key-Index] event to NFC-SEC layer in the NFC device 110. The PAX [Key-Index] command is a PAX command with the Key-Index. In an embodiment, the LLCP layer in the NFC device 110 moves from an ACTIVE to a CONFIGURE state. In an embodiment, the NFC-SEC layer will complete transmission of any frames pending in a transmit queue using the first key.

Further, if the Key-Index given by the NFC device 105 is known and valid in the NFC-SEC layer of the NFC device 110, then the NFC-SEC layer sends a CHANGE_KEY_RSP [Key-Index] to the LLCP of the NFC device 110. The CHANGE_KEY_RSP [Key-Index] command is a CHANGE_KEY_RSP with the Key-Index. Thereafter for successful key change, the LLCP layer of the NFC device 110 will send a PAX [Key-Index] response to the NFC device 105. Hence, any new transmission will be based on a key corresponding to the shared key-index. In an embodiment, the LLCP link moves from a CONFIGURE state to an ACTIVE state.

In an embodiment, the PAX command will be based on the first key. A CHANGE_KEY_RSP [Failure Code] command is sent to LLCP if the NFC-SEC layer in the NFC device 110 does not agree with the requested change in key. The CHANGE_KEY_RSP [Failure Code] command is a CHANGE_KEY_RSP with the Failure Code. Thereafter, a PAX with failure code is sent to the NFC device 105. Hence, the first key is not changed. The LLCP link then moves from a CONFIGURE state to an ACTIVE state and the communication will continue utilizing the first key to encrypt subsequent data.

In second exemplary method, the dynamic key change can also be handled by the commands in the NFC-SEC layer. This method can be used independent of the LLCP layer. NFC-SEC layer after the transmission of some determined count of data frames can choose to change a security keys used in the Secure Channel Framework. In the exemplary method described herein, it is assumed that a set of keys is already agreed and verified between the two NFC devices and the values are stored in a key table referred to by a key-index.

For changing a key through this method, the NFC-SEC layer of the NFC device 105 initially makes a local decision to change the first key to a second key corresponding to a key-index. In an embodiment, the NFC-SEC layer ensures that it transmits all the data frames in a transmit queue and it delivers all frames in the receive queue to the upper layer. Thereafter, the NFC-SEC layer after selecting a second key corresponding to the Key-Index changes the state of the communication from a confirmed to a verify state. The NFC-SEC layer of the NFC device 105 sends a Data Exchange Protocol Request frame, DEP_REQ (VFY_REQ) command to the NFC device 110 with the Key-Index as a parameter to verify whether the other device can also use the same key-index. In an embodiment of the invention, the details of the data exchange protocol and frame formats for DEP_REQ and DEP_RES are used as per the Near Field Communication Interface and Protocol (NFCIP-1) ECMA 340 Standard. Such a standard is well-known and readily available to those skilled in the art and need not be described in detail herein.

On reception of a successful Data Exchange Protocol Response frame, DEP_RES(VFY_RES) the NFC-SEC layer moves from a Verify state to a Confirmed state and switches from the use of a first key to the use of a second key. However, if it is a failure, DEP_RES [ERROR] is received and NFC-SEC returns to IDLE state. The DEP_RES [ERROR] command is a DEP_RES with the ERROR. In an embodiment, until the DEP_REQ (VFY_REQ), sequence is completed, the frames received from the upper or lower layers are either decoded and buffered or dropped.

At the NFC device 110, the NFC-SEC layer verifies the Key-Index on reception of the DEP_REQ (VFY_REQ) command from the NFC device 105. If the Key-Index is valid, a DEP_RES (VFY_RES) frame is sent. The state of NFC-SEC remains in a Confirmed state. Hence the key to be used in NFC-SEC layer is changed to the second key referred to by Key-Index. On reception of the DEP_REQ (VFY_REQ), the response is sent as a next frame from the NFC-SEC layer. No other frames are transmitted in the middle of this sequence. However, a DEP_RES [ERROR] command is sent to the Initiator if the Key-Index is invalid. NFC-SEC layer returns to IDLE state.

Figure 5:
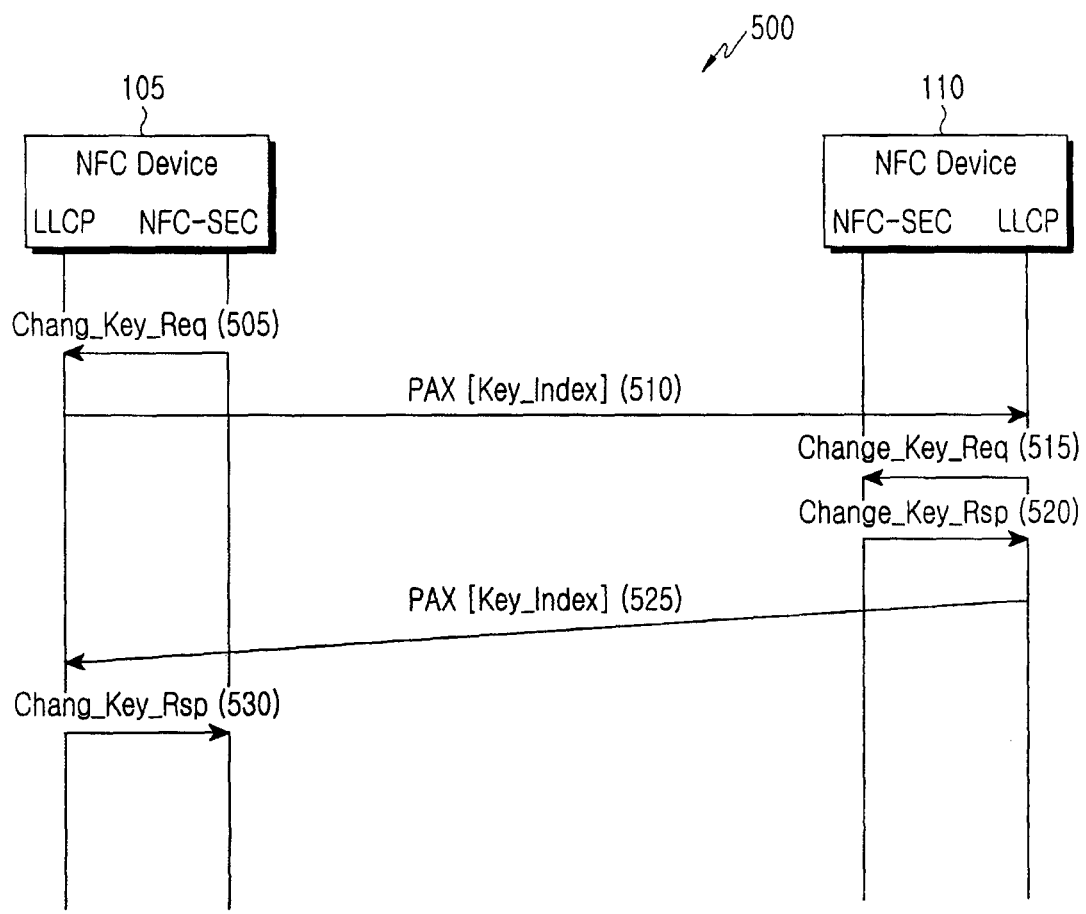
FIG. 5 illustrates a message flow diagram depicting a method for establishing secure communication in Near Field Communication (NFC) network, in accordance with one embodiment of the present invention.

FIG. 5 illustrates a message flow diagram depicting a method for establishing a secure communication in Near Field Communication (NFC) network, in accordance with one embodiment of the present invention. In this illustrated method, a plurality of applications are initially registered at a plurality of electronic devices, for example the electronic device 105 and the electronic device 110. For the sake of clarity and for the purpose of this description, the electronic device 105 and the electronic device 110 is also referred as Initiator LLCP and Target LLCP respectively.

Initially, a NFC-SEC layer in an NFC device, for example the NFC device 105 makes a local decision to change a key. For example, the NFC device 105 decides to change from the use of a first key to the used of a second key after at least one known criterion has been satisfied. In an embodiment, the second key corresponds to a key-index shared during previous communication. At step 505, the NFC-SEC layer in the NFC device 105 sends a CHANGE_KEY_REQ [Key-Index] command to LLCP layer. In an embodiment, the Key-Index is a unique identifier for the second key that is stored in a table in each of a plurality of NFC devices communicating with each other.

The NFC-SEC layer ensures that all data frames in a transmit queue are transmitted before initiating the CHANGE_KEY_REQ. In an embodiment, the LLCP in the NFC device 105 changes the state of LLCP link from an ACTIVE to a CONFIGURE state on reception of this command. Hence, this stops further data frames transmissions from the LLCP connections to be sent to NFC-SEC. The change key request can be initiated between the NFC devices through a CHANGE_KEY_REQ command and a response is received through CHANGE_KEY_RSP command.

At step 510, the LLCP layer of the NFC device 105 sends a PAX request command, for example PAX[Key-Index], with the key-index corresponding to the second key, to another NFC device, e.g., the NFC device 110. The NFC device then waits for a PAX response from the NFC device 110. In an embodiment, the PAX request command is secured using the first key. In an embodiment, all the data frames are exchanged based on the first key until the NFC device 105 receives a success command from the NFC device 110.

At step 515, an LLCP layer in the NFC device 110 sends a CHANGE_KEY_REQ[Key-Index] event to NFC-SEC layer after receiving the PAX[Key-Index] from the NFC device 105, In an embodiment, the LLCP layer in the NFC device 110 moves from an ACTIVE to a CONFIGURE state after receiving the CHANGE_KEY_REQ [Key-Index] command. In an embodiment, the NFC-SEC layer will complete transmission of any frames pending in a transmit queue using the first key.

At step 520, the NFC-SEC layer sends a CHANGE_KEY_RSP [Key-Index] to the LLCP of the NFC device 110 if the Key-Index given by the NFC device 105 is known and valid in the NFC-SEC layer of the NFC device 110. At step 525, the LLCP layer of the NFC device 110 sends a PAX [Key-Index] to the NFC device 105 for a successful key change. At step 530, the CHANGE_KEY_RSP [Key-Index] is sent from the LLCP of the NFC device 105 to the NFC-SEC layer.

Hence, any new transmission will be based on a key corresponding to the new and agreed-upon shared key-index. In an embodiment, the LLCP link moves from a CONFIGURE state to an ACTIVE state. In an embodiment, the PAX command will be based on the first key. A CHANGE_KEY_RSP [Failure Code] command is sent to LLCP if the NFC-SEC layer in the NFC device 110 does not agree to the change in key. Thereafter, a PAX with failure code is sent to the NFC device 105. Hence, the first key is not changed. The LLCP link then moves from a CONFIGURE state to an ACTIVE state.

Various embodiments of the present invention described above provide the following advantages. The present invention provides a method for secure communication in an NFC communication network. The method provides protection from brute force attack and replay attacks by dynamically changing the keys used for encryption and integration. The method also avoids abrupt termination of service when NFC-SEC layer sets a new key and/or a new value for Sequence Number (SN) field. Further, the method reduces additional processing during communication, as existing commands in LLCP and NFC-SEC are used for establishing communication with a new key for all communicating devices. The method can be also be used for changing a key when upper layer that are residing above NFC-SEC layer.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for secure communication between a plurality of electronic devices in a Near Field Communication (NFC) network, the method performed at a first electronic device comprising:
  sharing, in an NFC environment, a plurality of keys and a key index referencing the keys with a second device among the plurality of electronic devices prior to exchanging data therewith, wherein, in the NFC environment, a different sequence number according to a sequence number count is inserted in each data frame of a current data frame transmitting sequence, and an encryption key change normally occurs at the end of a sequence number count cycle;
  selecting a first key among the plurality of keys and exchanging data encrypted based on the selected first key with the second device; and
  replacing the first key with a second key among the plurality of keys, at a time during the current data transmitting sequence prior to the expiration of the sequence number count cycle, after at least one predetermined criterion has been satisfied, and communicating the key replacement between the first and second devices by referencing the second key in the key index, by transmitting a key change request to the second device and receiving a response thereto from the second device, wherein the key replacement associated with the request is made only if the response is an acceptance of the key change, and thereafter exchanging data between the first and second devices encrypted with the second key.

2. The method as claimed in claim 1, further comprising associating at least one key among the plurality of keys with at least one format among a plurality of data formats.

3. The method as claimed in claim 1, wherein the at least one predetermined criterion is a predefined time interval.

4. The method as claimed in claim 1, wherein the at least one predetermined criterion is a predefined amount of data exchanged.

5. The method as claimed in claim 1, wherein the at least one predetermined criterion is a predefined number of data exchanges.

6. The method as claimed in claim 1, further comprising establishing a communication channel based on a secure channel service of the NFC-security (SEC) layer.

7. The method as claimed in claim 1, further comprising establishing a communication channel based on a shared secret service of the NFC-SEC layer.

8. The method as claimed in claim 1, wherein the replacing the first key comprises changing the first key based on NFC-SEC protocol data units (PDU).

9. The method as claimed in claim 1, wherein the replacing the first key comprises changing the first key based on parameter exchange (PAX) protocol data units (PDU).

10. The method as claimed in claim 1, wherein the exchanging the data based on the first key comprises encrypting the data with the first key.

11. The method as claimed in claim 1, wherein the exchanging the data based on the first key comprises decrypting the data with the first key.

12. The method as claimed in claim 1, further comprising authenticating the data prior to exchanging the data with at least one among the plurality of electronic devices.

13. The method as claimed in claim 1, wherein individual keys of the plurality of keys are associated with different applications, respectively.

14. The method as claimed in claim 1, wherein the predetermined criterion is an identification of a security threat.

15. A system for secure communication between a plurality of electronic devices in a Near Field Communication (NFC) network, the system comprising:
a first electronic device including,
a transceiver for:
sharing, in an NFC environment, a plurality of keys and a plurality of key index values of a key index respectively corresponding to the plurality of the keys with a second device among the plurality of electronic devices prior to exchanging data therewith, wherein, in the NFC environment, a different sequence number according to a sequence number count is inserted in each data frame of a current data frame transmitting sequence, and an encryption key change normally occurs at the end of a sequence number count cycle; and
exchanging data encrypted based on a selected first key of the plurality of keys with the second device;
a processor for:
selecting the first key among the plurality of keys and replacing the first key dynamically with a second key among the plurality of keys, at a time during the current data frame transmitting sequence prior to the expiration of the sequence number count cycle, after at least one predetermined criterion has been satisfied, and informing the second device of the key replacement by transmitting a second key in the key index, corresponding to the second key, by transmitting a key change request to the second device and receiving a response thereto from the second device, wherein the key replacement associated with the request is made only if the response is an acceptance of the key change, and thereafter exchanging data between the first and second devices encrypted with the second key.

16. The system as claimed in claim 15, wherein the first electronic device associates at least one key among the plurality of keys with at least one data format among a plurality of data formats.

17. The system as claimed in claim 15, wherein the at least one predetermined criterion is a predefined time interval.

18. The system as claimed in claim 15, wherein the at least one predetermined criterion is a predefined amount of data exchanged.

19. The system as claimed in claim 15, wherein the at least one predetermined criterion is a predefined number of data exchanges.

20. The system as claimed in claim 15, wherein the first electronic device establishes a communication channel based on a secure channel service of the NFC-security (SEC) layer.

21. The system as claimed in claim 15, wherein the first electronic device establishes a communication channel based on a shared secret service of the NFC-SEC layer.

22. The system as claimed in claim 15, wherein the first electronic device changes the first key based on NFC-SEC protocol data units (PDU).

23. The system as claimed in claim 15, wherein the first electronic device changes the first key based on parameter exchange (PAX) protocol data units (PDU).

24. The system as claimed in claim 15, wherein the first electronic device authenticates the data prior to exchanging the data with at least one among the plurality of electronic devices.

25. The system as claimed in claim 15, wherein individual keys of the plurality of keys are associated with different applications, respectively.

26. The system as claimed in claim 15, wherein the predetermined criterion is an identification of a security threat.

* * * * *